United States Patent [19]
Summerfield et al.

[11] Patent Number: 5,990,062
[45] Date of Patent: Nov. 23, 1999

[54] LOW TOXICITY PAINT STRIPPER

[75] Inventors: Stephen R. Summerfield, Chesterfield; Matthew W. Clark, Clarkston; Neil R. Wilson, Ferndale; Michael E. Moore, Farmington Hills; Thomas A. Vivian, Flint, all of Mich.; Scott A. Hofacker, Athens, Ala.

[73] Assignee: Gage Products Company, Ferndale, Mich.

[21] Appl. No.: 08/994,059

[22] Filed: Dec. 19, 1997

[51] Int. Cl.[6] ............... C11D 7/18; C11D 7/30; C11D 7/52; C11D 9/04
[52] U.S. Cl. .......... 510/204; 510/201; 510/202; 510/206
[58] Field of Search .................. 510/201, 202, 510/203, 204, 206, 210, 212

[56] References Cited

U.S. PATENT DOCUMENTS

| | | | |
|---|---|---|---|
| 1,185,641 | 6/1916 | Ellis | 510/202 |
| 1,820,395 | 8/1931 | Lovell et al. | 510/202 |
| 1,884,774 | 10/1932 | Lougovoy | 510/202 |
| 3,094,491 | 6/1963 | Grminger, Jr. et al. | 252/171 |
| 3,355,385 | 11/1967 | Mackley | 252/104 |
| 3,391,085 | 7/1968 | Crockett | 252/143 |
| 3,574,123 | 4/1971 | Laugle | 252/144 |
| 3,616,803 | 11/1971 | Menkart et al. | 132/7 |
| 3,664,962 | 5/1972 | Kelley et al. | 252/125 |
| 3,988,256 | 10/1976 | Vandermey et al. | 252/171 |
| 4,024,085 | 5/1977 | Kobayashi et al. | 252/136 |
| 4,056,403 | 11/1977 | Cramer et al. | 134/22 |
| 4,120,810 | 10/1978 | Palmer | 252/153 |
| 4,269,724 | 5/1981 | Hodson | 252/171 |
| 4,294,729 | 10/1981 | Bakos et al. | 252/545 |
| 4,445,939 | 5/1984 | Hodson | 134/2 |
| 4,645,617 | 2/1987 | Vivian | 252/165 |
| 4,732,695 | 3/1988 | Francisco | 252/162 |
| 4,986,936 | 1/1991 | Wolbers | 252/170 |
| 5,185,235 | 2/1993 | Sato et al. | 430/331 |
| 5,215,675 | 6/1993 | Wilkins et al. | 252/100 |
| 5,425,893 | 6/1995 | Stevens | 252/166 |
| 5,454,985 | 10/1995 | Harbin | 252/558 |
| 5,518,661 | 5/1996 | Langford et al. | 252/364 |
| 5,536,439 | 7/1996 | Harbin | 510/212 |
| 5,597,788 | 1/1997 | Stevens | 510/212 |
| 5,696,072 | 12/1997 | Nercissiantz et al. | 510/206 |
| 5,721,204 | 2/1998 | Maxwell et al. | 510/206 |
| 5,759,975 | 6/1998 | Maxwell | 510/203 |
| 5,830,836 | 11/1998 | Smith et al. | 510/212 |

*Primary Examiner*—Yogendra Gupta
*Assistant Examiner*—John M. Petruncio
*Attorney, Agent, or Firm*—Gifford, Krass, Groh, Sprinkle, Anderson & Citkowski, P.C.

[57] ABSTRACT

A paint-stripping composition comprises, on a weight basis, at least 20% of a benzyl alcohol, together with 5–30% of methylene chloride, 1–10% of hydrogen peroxide and 10–60% of water. The composition may also include auxiliary ingredients such as thickeners, evaporation retardants, surfactants, pH control agents, accelerators, corrosion inhibitors, preservatives, coloring agents, and fragrances.

24 Claims, No Drawings

LOW TOXICITY PAINT STRIPPER

FIELD OF THE INVENTION

This invention relates generally to paint-stripping compositions, and more specifically it relates to a paint-stripping composition having low toxicity and a very low concentration of volatile organic compounds and/or hazardous air pollutants.

BACKGROUND OF THE INVENTION

Paint strippers are important industrial chemicals, and are used both in the finishing and refinishing of manufactured articles and in the clean-up of painting facilities. Large amounts of paint-stripping compositions are used in connection with the refinishing of commercial and military aircraft, as well as in the manufacture of motor vehicles.

A threshold requirement for a good paint-stripping composition is that it efficiently and effectively remove a variety of paints without harming the underlying workpiece. This requirement is particularly important in connection with the aircraft industry, since aircraft are frequently fabricated from aluminum or magnesium based alloys which are easily corroded by acidic or alkaline materials.

It is also most important that paint-stripping compositions be of relatively low toxicity. There is an ever growing concern about the release of volatile organic compounds (VOCs) and hazardous air pollutants (HAPs) into the atmosphere, because such compounds can be toxic to plant and animal life, and impose serious problems of atmospheric pollution. As a consequence, governmental regulations have strictly curtailed the amounts of VOCs and HAPs which an industry can release. As a consequence, industry must avoid the use of volatile organic compounds, or install expensive recovery systems. Since paint-stripping compositions are typically employed in large volumes, and distributed over relatively large areas, the escape of VOCs and HAPs therefrom can be significant. As a consequence, there is need for paint-stripping compositions which have a low content of volatile and/or hazardous organic compounds. Finally, since cost is always a significant concern with regard to chemicals such as paint-strippers which are used in large volumes, there is a need for a low-cost stripping composition which meets the foregoing criteria.

The foregoing requirements are often mutually exclusive, making it difficult for industry to develop paint-strippers which are highly effective against a broad spectrum of paints, that do not corrode relatively reactive aircraft alloys, and which are low in toxicity, low in cost, and have a low concentration of volatile and/or hazardous organic compounds. Caustic materials such as inorganic alkalis are highly effective for removing a variety of paints, but are also highly corrosive to many alloys, in addition to being dangerous and toxic. Organic compounds such as phenols are quite effective strippers for a variety of paints, and are generally non-corrosive, but these materials are highly toxic, and relatively expensive. Solvents such as benzene, toluene, and halocarbons are effective strippers for many commonly employed paints, but such materials are highly volatile, and in some instances, toxic and/or flammable.

A number of paint-stripping compositions are known in the prior art. For example, U.S. Pat. No. 5,454,985 discloses paint-stripping compositions based upon a mixture of benzyl alcohol and water, which compositions may also include acidic or alkaline accelerators. U.S. patent application Ser. No. 08/610,155 discloses paint strippers based upon benzyl alcohol and water which further include peroxide activators. U.S. Pat. No. 3,355,385 discloses paint-stripping compositions based upon aqueous hydrogen peroxide in combination with various organic solvents, including methylene chloride, and other halocarbons. U.S. Pat. Nos. 5,518,661 and 4,445,939 both show paint-stripping compositions based upon specific mixtures of benzyl alcohol and methylene chloride. As can be seen, the prior art has made many attempts at fabricating paint-stripping compositions, but to date, there is still a need for a highly effective, non-corrosive, low-toxicity paint-stripping composition having a low concentration of VOCs and HAPs.

In accord with the present invention, and as will be explained in greater detail hereinbelow, it has been found that paint-stripping compositions which are highly effective against a variety of paint formulations, and which are capable of operating at a neutral or near neutral pH (typically in the range of 4–8) can be prepared so as to include a relatively small amount of VOC or HAP materials therein. These and other advantages of the present invention will be apparent from the discussion, description and examples which follow.

BRIEF DESCRIPTION OF THE INVENTION

There is disclosed herein paint-stripping composition which comprises, on a weight basis, at least 20% of benzyl alcohol or an alkyl substituted benzyl alcohol, together with 5–30% of methylene chloride and 1–10% of hydrogen peroxide, together 10–60% of water. Most typically, the peroxide is added as a 35% aqueous solution, and the solution will thus comprise approximately 2.8–28.5% of the stripping composition. The composition may also include one or more auxiliary ingredients such as thickeners, evaporation retardants, surfactants, pH control agents, corrosion inhibitors, preservatives, coloring agents, and fragrances; and these auxiliary ingredients may comprise up to 20% by weight of the composition. In some cases, acidic accelerators may also be included in the composition. In some specific embodiments, the benzyl alcohol is present in an amount of 20–50% by weight, the hydrogen peroxide is present in an amount of 5–10% by weight, the methylene chloride is present in an amount of 15–20% by weight, and the water is present in an amount of 15–30% by weight.

Also included within the scope of the present invention, is a method of paint stripping, which method involves the use of the aforedescribed compositions.

DETAILED DESCRIPTION OF THE INVENTION

In accord with the present invention, it has been found that methylene chloride, water, peroxides, and a benzyl alcohol interact synergistically to produce a highly effective paint-stripping composition. Because of this synergistic interaction, the amount of methylene chloride in the stripping composition may be kept relatively low, thereby decreasing the level of VOC and/or HAP materials in the stripper. While the various components of the strippers of the present invention may be present in varied concentrations, it has been found that the specified compositional ranges and ratios of the materials provide superior stripping action against a variety of paint compositions, while still maintaining a relatively low level of volatile and/or hazardous materials. Various components of the stripper of the present invention will be discussed individually hereinbelow, and then various examples of the material will be presented; and unless otherwise noted, all compositions presented herein are on the basis of weight.

Benzyl Alcohol

An active component of the composition of the present invention is a benzyl alcohol. Most typically, the benzyl alcohol will be the unsubstituted benzyl alcohol; however, various alkyl substituted benzyl alcohols, such as methyl and ethyl benzyl alcohols (including the alpha, ortho, meta and para isomers) are known in the art, and such materials may also be employed in the present invention. Hence, it is to be understood that the term "a benzyl alcohol" refers to unsubstituted benzyl alcohol as well as substituted forms thereof. Most particularly, the benzyl alcohol is present on a weight basis of at least 20%. In most instances, concentrations of benzyl alcohol in excess of 50% have not been found to increase the efficiency of the strippers of the present invention, hence, most generally the benzyl alcohol composition will be in the range of 20–50%, and more preferably 30–40%. In one preferred group of formulations, the benzyl alcohol comprises approximately 40% of the composition. In another preferred group of compositions, the ratio of the benzyl alcohol to the methylene chloride is in the ratio of 2:1 to <3:1.

Water

In the present invention, it has been found that water is an active component of the stripping composition. In addition to participating in the stripping reaction, the water also lowers the cost of the composition and lowers the concentration of undesirable volatile materials therein. Most typically, water is present in an amount of 10–60% of the composition. One particularly preferred range of concentration for the water is 15–30%, and in a specific stripper formulation, water comprises approximately 25% of the material.

Peroxide

Peroxide is another active component of the stripping composition of the present invention. The peroxide is most preferably hydrogen peroxide, and is most typically present in an amount of 1–10% of the composition. It is to be noted that this range is given on an absolute basis; but because of handling and safety, hydrogen peroxide is most typically employed in the form of an aqueous solution, with a 35% solution being an industrial standard. Accordingly, in the practice of the present invention, the hydrogen peroxide component is most typically present in an amount of 2.8–28% by weight of a 35% solution. In one particularly preferred formulation, the hydrogen peroxide is present on an absolute basis in an amount of approximately 7% (20% of a 35% solution). It is to be understood that other concentrations of hydrogen peroxide may be similarly employed, depending upon availability and cost. In those instances where very dilute solutions of hydrogen peroxide are employed, the amount of water in this component should be taken into account and the total amount of water in the composition adjusted accordingly. It should also be noted that other peroxides, such as organic peroxides may also be employed in the present invention, and the appropriate amounts thereof calculated on the basis of their molar equivalence to hydrogen peroxide.

Methylene Chloride

Methylene chloride is the fourth active ingredient of the stripping composition of the present invention. As detailed herein, it is significant that the presence of the remaining components of the compositions of the present invention, permits low levels of methylene chloride to be employed, while still maintaining very good, broad spectrum stripping activity. In general, the methylene chloride should be present in an amount of at least 5% of the composition. In most instances, amounts of methylene chloride in excess of 30% are undesirable, since they contribute to the VOC/HAP levels of the composition. In typical compositions, it has been found that approximately 15–20% methylene chloride provides very good stripping action. In one group of compositions of the present invention, the methylene chloride comprises approximately 19% by weight.

Auxiliary Ingredients

While the foregoing components provide the basis for highly effective paint-stripping compositions of the present invention, in many instances, auxiliary ingredients will also be present in the stripping compositions. These might include thickeners, evaporation retardants, surfactants, pH control agents, corrosion inhibitors, preservatives, coloring agents and fragrances. For example, cellulose esters such as methyl cellulose, ethyl cellulose and the like may be included to increase the viscosity of the material to produce a stripper capable of clinging to non-horizontal surfaces.

Generally, it is desirable to include evaporation retardants in the mixture to further decrease release of volatile materials therefrom. Such evaporation retardants are well known in the art and include materials such as glycerine, wax, high molecular weight esters and the like. Surfactants such as Tergitol® and the like may also be advantageously included in the compositions. Surfactants facilitate wetting of the surface being stripped by the compositions, and may also assist in maintaining the homogeneity of the solution by enhancing solubilization, or emulsification of the various materials comprising the stripper.

It is a notable feature of the present invention that the composition is active and effective under relatively mild pH conditions, and thereby will not harm reactive aircraft alloys. Most typically, compositions of the present invention operate under neutral to near neutral pH conditions, typically in the range of pH 4–9. In some instances, acids or alkalis may be included to adjust the pH, and buffers may be included to assure that the pH remains stable. Corrosion inhibitors such as octamine and the like may be included in relatively low concentrations to further prevent any corrosion of metal surfaces, and/or to protect reactive metal surfaces from atmospheric corrosion, once stripping is complete. Preservatives such as citrates, benzoates, and the like may be included, as in known in the art, to prevent growth of unwanted microbes in the material. Also, coloring agents, fragrances and the like may be added to enhance the aesthetic appeal of the stripping composition. In general, the auxiliary ingredients will collectively comprise no more that 20% of the weight of the composition. Also, it should be noted that while the compositions of the present invention are useable at neutral to near neutral pH conditions, in some specific instances particular paint formulations may require that accelerators such as acids or alkalis may be added to the composition, as is known in the art, to further enhance the stripping ability thereof One preferred group of acidic accelerators comprises organic acids, with formic acid, acetic acid, propionic acid, glycolic acid, and halogenated forms thereof, being particularly preferred. It has been found, as is demonstrated herein, that the peroxide component of the composition interacts, beneficially, with the acid so as to enhance its effect. Therefore, only relatively small amounts of acid (typically 3–7%) are required to accelerate the stripping action. These low acid concentrations decrease the corrosivity of the acid accelerated strippers, making them particularly suitable for aircraft alloys. Likewise, the presence of the acid allows for a lowering of the peroxide content, thereby enhancing the stability of the composition, while still maintaining good stripping action.

Experimental Evaluation

In the first experimental series, a variety of stripping compositions were tested against various combinations of paints disposed upon aircraft alloy grade aluminum. In this experimental series, Composition 1 comprised a prior art stripping material which included 40% benzyl alcohol, 28% water, and relatively minor amounts of auxiliary ingredients including a cellulose ester thickener, a surfactant, 2% naphtha, wax and approximately 5% glycerine. Composition 2 was identical to Composition 1, except that it also included 7% hydrogen peroxide. Composition 3 was identical to Composition 1, except that it further included 13.5% methylene chloride. Composition 4 was identical to Composition 1 except that it included 7% hydrogen peroxide and 13.5% of methylene chloride.

In the first evaluation, these four compositions were tested against an aircraft panel from Southwest Airlines which was coated with a commercial coating designated Dexter-Crown Metro coating. These and all other evaluations were carried out at a temperature of 67.6° F. at a relative humidity of 54%. Composition 1 required 40 minutes to remove the coating. Composition 2 required 24 minutes to remove the coating. Composition 3 began removing the coating after 10 minutes, and Composition 4 removed most of the coating after 10 minutes.

These same four compositions were then evaluated against an aircraft panel which was coated with a first layer of BMS 1079 type I epoxy primer and a second layer of BMS 1060 type II polyurethane top coat, both of which are sold by the Courtaulds Aerospace Corporation. Composition 1 required 83 to 85 minutes to strip the panel. Composition 2 required 73 minutes to strip the panel. Composition 3 required 29 minutes to strip the panel, and Composition 4 stripped the panel in approximately 23 minutes. These four compositions were then evaluated against a more resistant coating system comprising thicker layers of the aforementioned paints. Composition 1 required 240 minutes to strip the panel. Composition 2 required 52 minutes to begin stripping and 73 minutes to complete stripping of the panels. Composition 3 required 45 minutes to begin stripping of the panels and 70 minutes to complete the stripping; and Composition 4 required 26 minutes to begin stripping of the panels and 33 minutes to complete the stripping.

These compositions were then tested against a painted aircraft panel obtained from Nippon Airways. Specific composition of the paint was unknown. Composition 1 produced no stripping whatsoever. Composition 2 produced no stripping after 8 hours contact, but did evidence some coating removal after contact was maintained overnight. Composition 3 produced no stripping and Composition 4 stripped the sample in approximately 6 to 7.5 hours.

Yet another evaluation was carried out on these four samples against an aircraft panel obtained from the Cessna Corporation. The specific composition of this coating was unknown. Compositions 1–3 produced no stripping whatsoever, while Composition 4 began stripping after 6.5 hours, and complete stripping was obtained after overnight contact.

In a second experimental series, a group of compositions containing various concentrations of the active ingredients of the stripper of the present invention were prepared to evaluate the concentration effects of the different components. A series of compositions designated Samples 5–18 were prepared, and each was evaluated against a test panel comprising a substrate of 2024-T3 clad aluminum which was treated with Alodine 1200 and painted with a first coat comprising BMS 1079 type II epoxy primer and a top coat of BMS 1060 type II polyurethane top coat. All samples were tested at 74.2° and 55% relative humidity. Each sample was spot applied to the panel and the time for removal of the coating was noted. The results are summarized in Table 1 hereinbelow.

TABLE 1

| SAMPLE | $CH_2Cl_2$ | WATER | $H_2O_2$ | BENZYL ALCOHOL | TIME |
|---|---|---|---|---|---|
| 5 | 0 | 43 | 7 | 40 | 43 |
| 6 | 5 | 38 | 7 | 40 | 42.5 |
| 7 | 19 | 24 | 7 | 40 | 13.5 |
| 8 | 30 | 13 | 7 | 40 | 15 |
| 9 | 19 | 29.5 | 1.5 | 40 | 40 |
| 10 | 19 | 28 | 3 | 40 | 24 |
| 11 | 19 | 24 | 7 | 40 | 13.5 |
| 12 | 19 | 21 | 10 | 40 | 12 |
| 13 | 19 | 27.8 | 15 | 28.2 | 12 |
| 14 | 19 | 28 | 3 | 40 | 24 |
| 15 | 19 | 5.6 | 3 | 62 | 32 |
| 16 | 19 | 24 | 7 | 40 | 13.5 |
| 17 | 19 | 13 | 7 | 51 | 23 |
| 18 | 19 | 43 | 7 | 21 | 46 |

In the compositions represented by Samples 5–8, the concentration of benzyl alcohol and hydrogen peroxide was maintained constant, while the amounts of methylene chloride and water were varied. As will be noted from Samples 5 and 6, a small enhancement in stripping action occurs as the methylene chloride level rises from 0 to 5%. Comparison of Samples 6 and 7 shows that the stripping efficiency increased significantly as the amount of methylene chloride rose from 5 to 19%. Comparison of Samples 7 and 8 demonstrates a decrease in efficiency as the amount of water decreased from 24 to 13%, even though the amount of methylene chloride increased slightly.

In Samples 9–12, the concentration of hydrogen peroxide was varied, while the amounts of benzyl alcohol and methylene chloride were held constant, and the amounts of water were held fairly constant. These samples demonstrate the stripping efficiency rose as the peroxide concentration increased from 1.5 to 10%.

Samples 14 and 15 demonstrate that stripping efficiency drops to some degree as the water concentration is decreased, even though the amount of benzyl alcohol present is increased, thereby indicating that water is an active component in the composition. In compositions 16–18, both water and benzyl alcohol are varied.

A third experimental series was carried out to evaluate effect of substituting other solvent materials for the methylene chloride. In this experimental series, as summarized in Table 2, compositions of 24% water, 7% hydrogen peroxide and 40% benzyl alcohol were prepared, together with 19% of methylene chloride (Sample 19), or other materials (Samples 20–23). These compositions were tested against aforedescribed panels at 74.2° F. and 55% relative humidity. The results of these tests are summarized in Table 2 hereinbelow.

TABLE 2

| SAMPLE | COMPOUND | TIME |
|---|---|---|
| 19 | $CH_2Cl_2$ | 13.5 |
| 20 | Oxsol 100 | 52 |
| 21 | Oxsol 10 | 52 |
| 22 | TCE | 27 |

TABLE 2-continued

| SAMPLE | COMPOUND | TIME |
| --- | --- | --- |
| 23 | PCE | 47 |
| 24 | — | 43 |

Sample 19 included methylene chloride as the solvent, and stripping time was 13.5 minutes. Sample 20 substituted a proprietary fluorinated solvent sold under the designation Oxsol 100 by the Occidental Petroleum Company, for the methylene chloride, and it will be noted that the stripping time increased significantly. Sample 21 substitutes chlorinated solvent sold by the Occidental Petroleum Corporation under the designation Oxsol 10 for the methylene chloride, and again stripping time is significantly increased. Sample 22 substitutes trichloroethylene for the methylene chloride, and while some effect is noted, it is clear that the stripper which includes methylene chloride is significantly better. Sample 23 substitutes perchlorethylene for the methylene chloride, and stripping time is significantly increased. Sample 24 includes no methylene chloride substitute and is merely comprised of benzyl alcohol, water and peroxide, it is notable that the performance of this composition is slightly better than that of Samples 20, 21 and 23, indicating that the compounds used therein are actually detrimental to the stripping effect.

A fourth experimental series was carried out utilizing the aforedescribed coated panels for the purpose of evaluating the effect of the benzyl alcohol component. In this experimental series, a group of stripping compositions were prepared which included 19% methylene chloride, 24% water, 7% hydrogen peroxide and 40% of the various solvent compounds. These results are summarized in Table 3 hereinbelow.

TABLE 3

| SAMPLE | COMPOUND | TIME |
| --- | --- | --- |
| 25 | Benzyl Alcohol | 13.5 |
| 26 | Oxsol 100 | — |
| 27 | Oxsol 10 | — |
| 28 | DBE | 113 |
| 29 | Triton N | — |
| 30 | MPK | 48 |
| 31 | NMP | 33 |

Sample 25 included benzyl alcohol, and the stripping time was 13.5 minutes. Samples 26 and 27 included the aforedescribed Oxsol 100 and 10 solvents, and no stripping action occurred. Sample 28 included commercially available solvent material sold under the designation Dibasic Ester, by the DuPont Corporation, and the composition required 113 minutes to strip. Sample 29 substitutes nonylphenyl ether material sold under the designation Triton N for the benzyl alcohol, and this composition was not effective as a paint stripper. Sample 30 evaluated the effect of substituting methylpropyl ketone for the benzyl alcohol, and it will be noted that this material did not produce a strong stripping action. Sample 31 evaluated the effect of substituting N-methyl pyrrolidone for the benzyl alcohol, and again it will be noted that this composition was not a highly effective paint stripper. This is particularly significant since NMP is a widely employed paint-stripping material.

In a fifth experimental series, the use of organic peroxides was evaluated. Two stripper compositions were prepared; each included 19% methylene chloride, 40% benzyl alcohol, 24% water, and 0.21 moles of total peroxide. The first composition employed hydrogen peroxide and the second sample employed t-butylhydroperoxide. Both samples were evaluated against the standard panels described above at 74.2° F. and a relative humidity of 55%. The hydrogen peroxide containing material stripped the panels in 13.5 minutes, while the sample containing the organic peroxide required 62 minutes to complete the stripping.

In a sixth experimental series, the effect of acidic accelerators was evaluated. A series of five stripper compositions, samples 32 to sample 36, were prepared. All of the samples included, by weight, 19% methylene chloride and 40% benzyl alcohol together with the listed percents of formic acid and/or hydrogen peroxide, with the balance of the composition being water. All of the samples were evaluated against the standard panels described above at 74.2° F. and a relative humidity of 55%. Sample 32 had 3% peroxide and no formic acid; as such it corresponded to Sample 14 on Table 1, and as will be noted, it stripped the test panel in 24 minutes. Sample 33 was generally similar to Sample 32, except that it also included 5% of formic acid, and it will be noted that the stripping time was decreased to 14 minutes. Sample 34 included 7% peroxide and no formic acid, and as such it corresponds generally to Sample 16 of Table 1, and in this experiment, it stripped the panel in 14 minutes. Sample 35 included 10% formic acid and no peroxide, and it stripped the test panel in 29 minutes. Sample 36 corresponded generally to Sample 35, but further included 7% peroxide, and it stripped the panel in 9 minutes.

TABLE 4

| SAMPLE | FORMIC ACID | $H_2O_2$ | TIME |
| --- | --- | --- | --- |
| 32 | 0 | 3 | 24 |
| 33 | 5 | 3 | 14 |
| 34 | 0 | 7 | 14 |
| 35 | 10 | 0 | 29 |
| 36 | 10 | 7 | 9 |

From the foregoing, it will be seen that the formic acid and peroxide interact in a beneficial manner to produce a stripping effect which is greater than would be achieved by the use of either of the materials alone. For example, Sample 33 stripped the panel in 14 minutes, while Sample 32, which did not include formic acid, required 24 minutes for stripping. Sample 34 did not include any formic acid, and it stripped the panel in a time comparable to Sample 33, but required a 7% peroxide content. It is notable that Sample 35 includes a relatively high acid content, and no peroxide, and this sample required the longest stripping time. Sample 36, which includes a relatively high concentration of acid together with 7% peroxide, produced a very rapid strip time.

From the foregoing, it will be seen that the acid and peroxide interact in the stripping composition in a manner which allows for a reduction of the concentration of both of the components thereby decreasing both the corrosive nature of the stripper as well as the peroxide content. In those instances where corrosion of a substrate is not a consideration, relatively high concentrations of acid, typically 10%, may be employed. However, in many instances, it is desirable to avoid corrosion. It has been found that even relatively reactive aircraft alloys are not significantly corroded by formic acid concentrations of 5% or less, and if such low acid concentrations are employed in combination with peroxide, stripping times far better than those achieved by higher acid content materials are easily achieved.

Therefore, in accord with another aspect of the present invention, paint stripping compositions of the type described herein may further include acidic accelerators therein. These accelerators typically comprise organic acids. Formic acid is one particularly preferred acid accelerator, since it is relatively low in cost, low in toxicity and highly effective. Other accelerators include low molecular weight organic acids such as acetic acid, propionic acid, lactic acid and glycolic acid. In some instances, the acids may be halogenated to further enhance their activity. Generally, the concentration of the acid will be no more than 10%, and in a particularly preferred group of compositions, the acid concentration will be 5% or less. One particular composition includes formic acid as an accelerator, and the acid is present in a concentration of 5% or less, together with hydrogen peroxide in an amount of 3–7%. Formic acid is a relatively strong acid, and in the event that other, weaker acids are substituted therefor, the concentration of accelerator may be adjusted upwardly as appropriate.

As is described hereinabove, paint-stripping compositions having relatively low levels of HAP and/or VOC materials may be fabricated a mixture of at least 20% of a benzyl alcohol together with 5 to 30% of methylene chloride, 1 to 10% of hydrogen peroxide (or a molar equivalent) and 10 to 60% of water. These compositions further include auxiliary ingredients such as thickeners, corrosion inhibitors, pH control agents, accelerators, colors, preservatives, fragrances, evaporation retardants, surfactants, and the like. The compositions of the present invention are effective against a wide variety of paint formulations, including paint formulations which are utilized in the aircraft industry.

The discussion and examples presented hereinabove represent some specific embodiments of stripping compositions of the present invention. Within the guidelines given hereinabove, and in view of the disclosure herein, one of skill in the art could readily prepare various stripping compositions optimized for specific purposes. Therefore, it is to be understood that the foregoing discussion, description and examples are illustrative of particular embodiments of the present invention but are not meant to be limitations upon the practice thereof. It is the following claims, including all equivalents, which define the scope of the invention.

We claim:

1. A paint-stripping composition comprising, on a weight basis:
    at least 20% of benzyl alcohol or an alkyl substituted benzyl alcohol;
    5–30% of methylene chloride;
    1–10% of hydrogen peroxide; and
    10–60% of water.

2. A paint-stripping composition as in claim 1, further including at least one auxiliary ingredient selected from the group consisting of thickeners, evaporation retardants, surfactants, pH control agents, accelerators, corrosion inhibitors, preservatives, coloring agents, and fragrances.

3. A paint-stripping composition as in claim 2, wherein said at least one auxiliary ingredient comprises, on a weight basis, up to 20% of said composition.

4. A paint-stripping composition as in claim 1, wherein said benzyl alcohol or alkyl substituted benzyl alcohol is present in the range of 20–50% by weight.

5. A paint-stripping composition as in claim 1, wherein said hydrogen peroxide is present in the range of 3–10% by weight.

6. A paint-stripping composition as in claim 5, wherein said hydrogen peroxide is present in an amount of approximately 7% by weight.

7. A paint-stripping composition as in claim 1, wherein said methylene chloride is present in the range of 10–20% by weight.

8. A paint-stripping composition as in claim 1, wherein said water is present in the range of 15–30% by weight.

9. A paint-stripping composition as in claim 1, wherein the ratio of said benzyl alcohol or alkyl substituted benzyl alcohol to said methylene chloride is in the range of 2:1 to <3:1.

10. A paint-stripping composition as in claim 1, further including an acidic accelerator therein.

11. A paint-stripping composition as in claim 10, wherein said acidic accelerator is selected from the group consisting of formic acid, acetic acid, propionic acid, lactic acid, glycolic acid, halogenated forms of the foregoing acids, and combinations thereof.

12. A paint-stripping composition as in claim 11, wherein said accelerator comprises formic acid.

13. A paint-stripping composition as in claim 12, wherein said formic acid is present in an amount of up to 5% by weight.

14. A paint-stripping composition consisting essentially of, on a weight basis:
    20–50% of benzyl alcohol or an alkyl substituted benzyl alcohol;
    5–30% of methylene chloride;
    1–10% of hydrogen peroxide; and
    10–60% of water.

15. A paint-stripping composition as in claim 14, further including at least one auxiliary ingredient selected from the group consisting of thickeners, evaporation retardants, surfactants, corrosion inhibitors, pH control agents, accelerators, preservatives, coloring agents, and fragrances.

16. A paint-stripping composition as in claim 14, further including an acidic accelerator in an amount, by weight, of up to 5%.

17. A method of stripping paint from a workpiece, said method comprising of the steps of:
    providing a paint-stripping composition comprising, on a weight basis:
        at least 20% of benzyl alcohol or an alkyl substituted benzyl alcohol;
        5–30% of methylene chloride;
        1–10% of hydrogen peroxide; and
        10–60% of water; and
    contacting said workpiece with said paint-stripping composition.

18. A method as in claim 17, wherein said step of providing said paint-stripping composition comprises providing a paint-stripping composition further including at least one auxiliary ingredient selected from the group consisting of thickeners, evaporation retardants, surfactants, corrosion inhibitors, pH control agents, accelerators, preservatives, coloring agents, and fragrances.

19. A method as in claim 17, wherein the step of providing said paint-stripping composition comprises providing a composition in which said benzyl alcohol or alkyl substituted benzyl alcohol is present in the range of 20–50% by weight.

20. A method as in claim 17, wherein the step of providing said paint-stripping composition comprises providing a paint-stripping composition in which said hydrogen peroxide is present in the range of 5–10% by weight.

21. A method as in claim 17, wherein the step of providing said paint-stripping composition comprises providing a paint-stripping composition in which said methylene chloride is present in the range of 15–20% by weight.

22. A method as in claim 17, wherein the step of providing said paint-stripping composition comprises providing a paint-stripping composition in which said water is present in the range of 15–30% by weight.

23. A method as in claim 17, wherein the step of providing said paint-stripping composition comprises providing a paint-stripping composition in which the ratio of said benzyl alcohol on alkyl substituted benzyl alcohol to said methylene chloride is in the range of 2:1 to <3:1.

24. A method as in claim 17, wherein the step of providing said paint-stripping composition comprises providing a paint-stripping composition including, by weight, up to 5% of formic acid.

* * * * *